Sept. 10, 1946.   F. W. CHAPMAN   2,407,536
COMPASS
Filed June 23, 1943
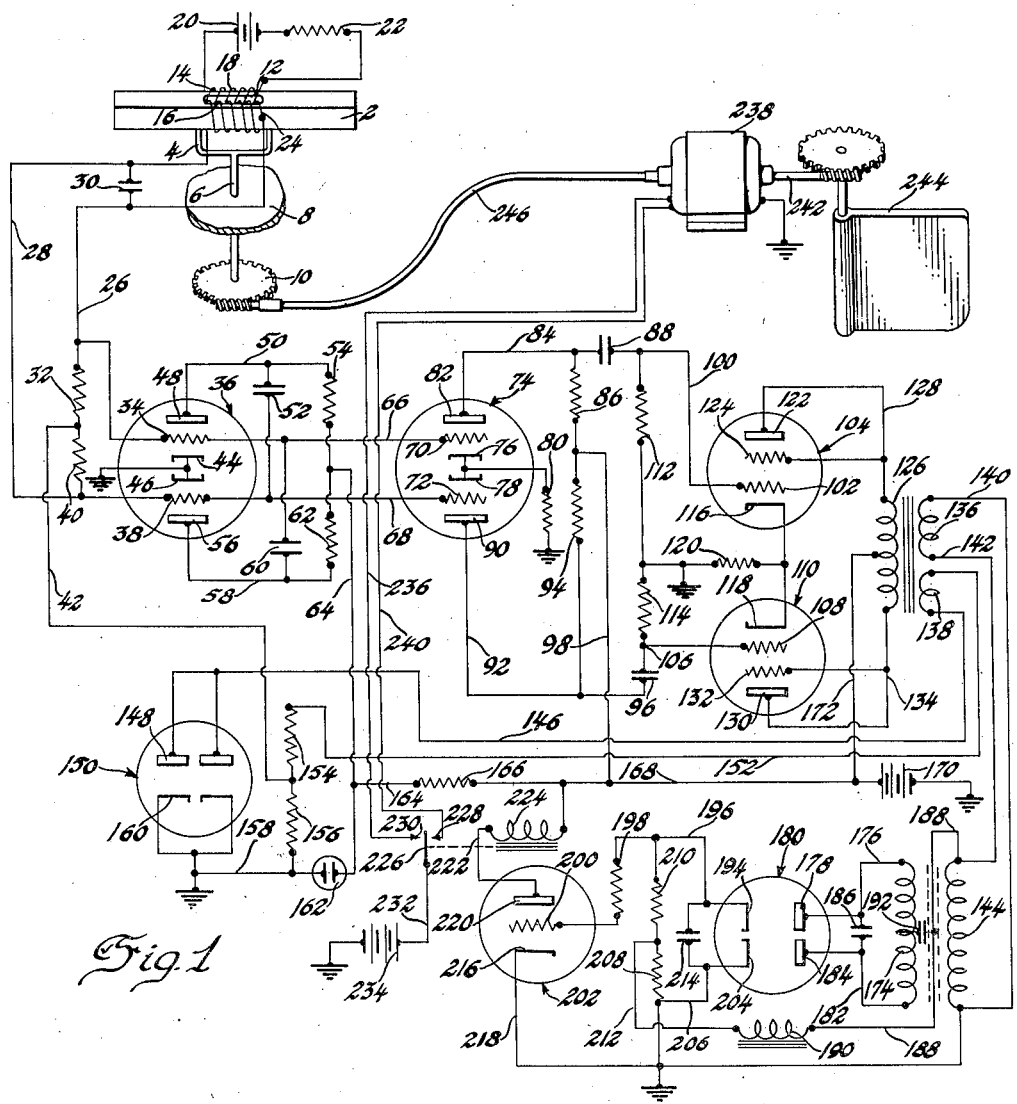
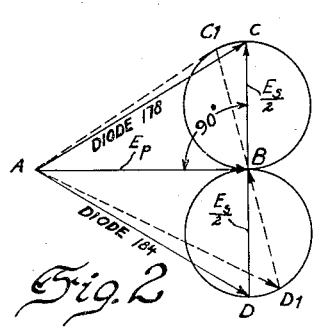
Fig. 2
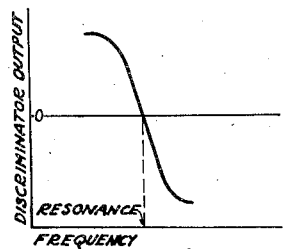
Fig. 3
Inventor
Frederick W. Chapman
By
Blackmor, Spencer & Hirt
Attorneys Patented Sept. 10, 1946

2,407,536

UNITED STATES PATENT OFFICE 2,407,536

COMPASS

Frederick W. Chapman, Detroit, Mich., assignor to General Motors Corporation, Detroit, Mich., a corporation of Delaware Application June 23, 1943, Serial No. 491,881

11 Claims. (Cl. 172—239)

This invention relates to direction sensitive means and more particularly to means sensitive to variations in magnetic field strength or flux of the order of that in the earth's magnetic field whereby said means may be utilized to indicate direction variation.

One of the standard means for indicating direction has been the magnetic compass in its various forms which in all instances had therein delicately balanced and pivoted or rotatable parts which were very sensitive to mechanical vibration and jar and relatively fragile. There was therefore developed an indicator bar compass of high permeability such as disclosed in copending application Serial No. 487,566, filed May 19, 1943, in the names of E. J. Martin and Carl Grinstead, assigned to a common assignee, which may be rigidly secured to a body such as a plane or ship and has no moving parts, the flux through the bar depending upon its position in the horizontal component of the earth's field and therefore the direction in which the ship is heading. Therefore, by measuring the magnetization of the inductor bar, an indication of direction or control may be obtained.

It is an object of my invention to provide an amplifying and indicating system to be used with the high permeability inductor bar compass.

It is a further object of my invention to provide an electronic pick-up and amplifying circuit for the inductor bar compass.

It is a still further object of my invention to provide a sensitive compact amplifying system for the compass.

It is a still further object of my invention to provide a pick-up and amplifier circuit which operates on a frequency difference controlled from the inductor bar.

It is a still further object of my invention to provide a pick-up, amplifying and indicating circuit wherein a change in flux in the inductor bar will vary the inductance of a pick-up coil to in turn vary the frequency of the amplifier circuit.

It is a still further object of my invention to provide an amplifying and indicating system operating on a small phase variation.

With these and other objects in view which will become apparent as the specification proceeds, the embodiments of my invention will be best understood by reference to the following specification and claims and the illustrations in the accompanying drawing, in which:

Figure 1 is a schematic diagram showing the various parts and the electrical connections between them.

Figure 2 is a vector diagram showing the voltage relationships in the certain parts of the circuit, and Figure 3 is a graph of a curve illustrating the change in the discriminator output of the circuit with the frequency input.

Referring now more specifically to the drawing, the inductor bar magnet 2 formed of high permeability material, such as Permalloy or Mumetal, is shown mounted on a support that may be turned such as a bracket 4 having a shaft 6 which passes through a stationary member 8 which forms a bearing therefor and has mounted on its lower end a worm wheel 10. The bar per se has a central opening 12 therethrough forming on each side spaced legs 14 and 16 of magnetic material. Wound around leg 14 is coil 18 to which is connected battery 20 and resistor 22 which provide from the direct current a steady unidirectional flux in the bar 2.

Coil 24 wound on the opposite leg 16 has one terminal connected to line 26 and the opposite terminal connected to line 28. A condenser 30 is connected across lines 26 and 28. Line 26 is connected to one end of a resistor 32 and to one of the control grids 34 of a twin triode oscillator tube 36. Line 28 is connected to a second control grid 38 of tube 36 and also to one end of a resistor 40. The opposite ends of both resistors 32 and 40 are connected together and to line 42. The cathodes 44 and 46 of tube 36 are connected to ground.

The upper plate 48 of tube 36 is connected by line 50 to a condenser 52 and resistor 54 and lower plate 56 is similarly connected by line 58 to a condenser 60 and resistor 62, the opposite ends of the two resistors 54 and 62 being connected together and to line 64. The control grids 34 and 38 of tube 36 are connected through lines 66 and 68 respectively to control grids 70 and 72 in a second twin-triode tube 74. The cathodes 76 and 78 in this instance are grounded through resistor 80. Plate 82 of tube 74 is connected through line 84 with resistor 86 and condenser 88. The second plate 90 of tube 74 is connected through line 92 with resistor 94 and condenser 96. The opposite terminals of the two resistors 86 and 94 are connected together and to line 98.

Connected to the other side of condenser 88 is line 100 which extends to one of the control grids 102 of a tetrode tube 104. In like manner a line 106 connects the opposite side of condenser 96 to a control grid 108 of tube 110. Connected across lines 100 and 106 are two resistors 112 and 114 in series relation, the center tap of which is grounded. The cathodes 116 and 118 of the tubes 104 and 110 are likewise connected to ground through resistor 120. The plate 122 and second grid 124 of tube 104 are connected together and to one primary terminal of transformer 126 by line 128 and plate 130 and grid 132 of tube 110 are also connected together and to the opposite transformer primary terminal by line 134.

The secondary of the transformer is formed of two coils 136 and 138, the first of which is connected by lines 140 and 142 to a transformer primary coil 144. The second coil 138 is connected by line 146 with both anodes 148 of a rectifier tube 150 and by line 152 with a resistor 154, the opposite end of which is connected to line 42. A resistor 156 is also connected to ground and to line 42. The cathodes 160 of the tube 150 are likewise connected to the same ground at line 158. A gas-filled diode 162 is connected between line 158 and line 64 and acts as a voltage regulator.

Line 64 is connected by line 164 with resistor 166 which is in turn connected by line 168 with a battery 170. Line 172 extends between the center tap on the secondary of transformer 126 and line 168. Associated with primary 144 is a center tapped secondary 174, one end of which is connected by line 176 with an anode 178 of rectifier tube 180. The opposite secondary terminal is connected by line 182 with a second anode 184 in tube 180. A condenser 186 is connected across the secondary 174 between lines 176 and 182. One terminal of the primary 144 is connected to line 188 which extends to choke coil 190 and also condenser 192, which latter is in turn connected to the center tap on transformer secondary 174.

Cathode 194 of tube 180 is connected to line 196 which is connected through resistor 198 with the control grid 200 of a triode tube 202. A second cathode 204 is connected by line 206 with a resistance 208 and also to ground. A second resistance 210 is connected to resistance 208 and to line 196, the center tap of these two resistances being connected to the choke coil 190 by line 212. Condenser 214 is connected across the two cathodes and lines 196 and 206. The cathode 216 of tube 202 is connected to ground by line 218. The plate 220 of tube 202 is connected through line 222 to relay coil 224 which in turn is connected to line 168. This relay coil actuates an armature 226 which moves between two contact points to cause desired switching being pulled in one direction against contact 228 by the relay coil and urged against a second spaced contact 230 by a spring (not shown). The armature is connected by line 232 to a source of power such as battery 234.

Contact 230 is connected by line 236 with one winding of a reversible motor 238 and contact 228 is connected to a second winding of motor 238 for driving the motor in the opposite direction, said connection being through line 240. Thus as the armature makes contact with 230 or 228 the battery will be connected to one or the other winding of the motor and the same will run first in one direction and then reverse. Movement of the motor armature and shaft 242 causes steering mechanism such as diagrammatically shown at 244 to be turned to control a course and at the same time through flexible tube driving means 246 cause rotation of the gear 10 to turn the flux sensitive element as a follow-up device to maintain its orientation.

In operation the inductor bar is mounted on means that can be turned to provide follow-up action in a body which it is desired to steer on a predetermined course, such, for example, as a ship. The battery 20 provides a steady magnetizing current to the inductor bar through coil 18 of such strength as may be desired to provide operation of the device on a selected portion of the magnetization curve. Then as the ship turns and varies its position in the earth's magnetic field, the magnetization of or the flux within the bar 2 will be altered and the amount of such alteration or variation will indicate how far the bar has been turned. As the magnetization changes are the indicating or controlling factor, the same must be picked up for control and this is done by the winding 24 whose inductance will be changed as the magnetization of the core or bar changes.

This inductance or pick-up coil 24 is connected to condenser 30 and forms therewith a resonant circuit at a particular frequency. When the inductance changes, the resonant frequency of this tuned circuit will of course change. This tuned circuit is then connected into and controls the operation of an oscillator tube 36, the resultant signal then being fed into a voltage amplifier 74. The output of the voltage amplifier is fed into the push-pull power amplifier consisting of two tubes 104 and 110. The output of the power amplifier supplies energy to two paths; the energy induced in coil 138 is fed back through an amplifier rectifier control to maintain a substantially constant wave amplitude, and that induced in coil 136 is conducted to a discriminator circuit which through operation presently to be described provides a relatively large change in output for a small swing in frequency. This output variation is applied to a vacuum tube relay 202, 224 which operates the switch armature 226 back and forth between the contact points to energize the selected motor coil and turn the motor armature to again align the bar with the earth's field.

With the foregoing general description of the operation of the various parts of my invention, the same will now be described more in detail. That the flux through the inductor bar 2 will vary, depending upon whether the bar is aligned with or at an angle to the earth's field, is obvious and also the fact that the magnetization of the bar or core will change with this flux change. Since the magnetic field changes, the inductance of a coil wound on the core will also change, and since this is connected in circuit with a condenser the two will form a resonant circuit, the frequency of which will vary slightly as the field through the bar varies. The bar is of course of material of high permeability in order to operate at a point of high sensitivity, that is, one in which a slight change in flux will provide a large change in permeability. Therefore a unidirectional field is introduced through coil 18 and so adjusted that the bar is operating at the most sensitive part of the magnetization curve.

This resonant circuit is connected to the double oscillator tube 36 by lines 26 and 28 to the grids and therefore controls the frequency generated by the oscillator. Thus any change in orientation of the bar in the earth's field will change the inductance of the coil and the frequency of the oscillator. The output voltage of the oscillator 36 is amplified by tube 74 since the plates 48 and 56 of tube 36 are connected to grids 72 and 70 of tube 74 respectively through condensers 52 and 60.

The output of the voltage amplifier is taken from plates 82 and 90 and is capacity coupled by means of condensers 88 and 96 to the grids 102 and 108 of a push-pull power amplifier stage consisting of two tubes 104 and 110. This power amplifier output is supplied to transformer primary 126 from plates 122 and 130. Up to this stage I have provided an oscillator whose frequency is varied by means whose inductance varies relative to its orientation in the earth's magnetic field and means for amplifying the output of said oscillator.

From the power amplifier output, coil 138 picks up a certain amount of energy and feeds this back to what might be termed an amplitude control in that this voltage is applied across rectifier tube 150 to develop a voltage across resistor 156 which voltage is fed back through line 42 and resistors 32 and 40 to the oscillator grids. This feed back voltage is inversely phased to input voltage so that any tendency of the amplitude to increase will immediately be met by a fed back potential in the opposite direction to nullify or counteract the same and maintain substantially constant amplitude. Gaseous tube 162 is also applied to maintain the voltage on the oscillator plates substantially constant. Thus the only variations at the oscillator are frequency changes due to inductance changes due to variations in orientation in the earth's field, the amplitude remaining substantially constant.

The second transformer secondary 136 is connected to the discriminator portion of the circuit. It is connected directly across and feeds power to the primary coil 144 which is associated with the center tapped secondary 174. This portion of the circuit is sensitive to frequency changes and through the phase relationships of the primary and secondary coils causes a marked change in the voltages applied to the diode electrodes of tube 180 connected to said secondary. It is desired to point out at this time that the primary coil 144 is connected to the center tap of the secondary through condenser 192.

The discrimination principle depends upon the phase relationships between primary and secondary voltages in a tuned coupled circuit. In the present instance the secondary is tuned by condenser 186 and coupled to the primary. The phase difference between the primary and secondary voltages at resonance is 90°. However, this relationship changes very rapidly if the frequency is varied slightly off resonance. This is best shown by the vector diagram Figure 2 which illustrates the voltages across the coils and across the diodes of tube 180. The solid lines in Figure 2 denote the condition at resonance and indicate the voltages applied to the diodes. The solid line A—B indicates the primary voltage $E_p$, the solid line B—C indicates that voltage of the upper half of the secondary $E_s/2$ and line B—D that voltage in the lower half of the secondary $E_s/2$. The upper diode electrodes 184—178 therefore have applied therebetween a resultant voltage A—C which is the vector sum of $E_p$ and $E_s/2$ for the upper half. Likewise, at the same time the lower pair of electrodes 204—184 have a voltage A—D across them which is equal to the vector sum of $E_p$ and $E_s/2$ for the lower half of the secondary. These diode voltages are rectified and cause direct current voltages across resistors 208 and 210 which voltages cancel out due to the differential connection since they are equal and thus the discriminator output voltage is zero when in resonance with the oscillatory frequency.

If now there is a small variation in the frequency, due to inductance change, which is fed to the discriminator primary, the phase relationships will be altered and may assume a position such as that shown in dashed lines on Fig. 2. It will be obvious that this phase shift between the primary and secondary voltages will cause a variation in resultant voltage applied to the diode. Thus the voltage A—$C_1$ applied to the upper diode 178, is less than in the balanced condition and voltage A—$D_1$ applied to diode 184 is more than previously indicated. Again a D. C. voltage is developed across the resistors 208 and 210 in proportion to the A. C. voltage above indicated. However, in this case the voltage across 210 is less than that across 208 and the voltage difference appears across the tube 202. If the frequency deviation had been in the opposite direction, the output voltage of the discriminator would have been of opposite polarity since resistor 210 would be of higher voltage than 208. The variation in discriminator output voltage as plotted against frequency is shown in Figure 3 where the horizontal line midway of the curve indicates zero potential and where the curve crosses this line will of course be the resonance point. It will be noted that any deviation from the resonant frequency considerably varies the output.

This output potential is applied to the control grid of the vacuum tube 202 which in turn controls the relay 224. When the potential of the grid is sufficient to permit electron flow through the tube, the coil 224 will attract the armature 226 to close the motor winding circuit through line 240 and the motor will run in one direction to alter the position of the steering mechanism and also the indicator bar as a follow-up.

When the latter turns, however, the frequency will be varied in the opposite direction, causing the phase shift to reverse and cutting off flow of current through the tube 202. This releases the armature 226 and it snaps back due to spring pressure to close the motor winding circuit 236 and cause the motor to turn the steering rudder and follow-up mechanism in the opposite direction. This is what is known as a hunting system as there is no null or off point, but the motor keeps running first in one direction and then in the other on both sides of a defined axis.

It will be evident that by setting the inductor bar initially in a given position, preferably East-West, and then adjusting the circuit to resonance, that any change in the orientation of the vehicle in the earth's field will cause the frequency to change and in turn unbalance the discriminator output to cause the motor to reverse and maintain a hunting relation and try to retain its given position in the field.

I claim:

1. In a control system, means whose inductance is altered by a change in its relative axial position in a magnetic field, a circuit connected thereto to form a resonant circuit with said first-named means, an oscillator controlled by said resonant circuit and means whose output will change polarity as the frequency of the oscillator varies either above or below a defined frequency, as controlled by the position of the first-named means, connected to said oscillator output.

2. In a control system, means whose inductance is altered by a change in its relative axial position in a magnetic field, a circuit connected thereto to form a resonant circuit with said first-named means, an oscillator controlled by said resonant circuit and means whose output will change polarity as the frequency of the oscillator varies either above or below a defined frequency, as controlled by the position of the first-named means, connected to said oscillator output, and control means connected to the polarity varying means.

3. In a control system, means whose inductance is altered by a change in its relative axial position in a magnetic field, capacity means connected thereto to form a resonant circuit, an oscillator controlled by said resonant circuit, an amplifier connected to the oscillator, amplitude control means connected between the amplifier output and the oscillator input to maintain the amplitude constant, and means whose polarity will reverse upon deviation of frequency above or below a definite index connected to the amplifier output.

4. In a control system, means whose inductance is altered by a change in its relative axial position in a magnetic field, capacity means connected thereto to form a resonant circuit, an oscillator controlled by said resonant circuit, an amplifier connected to the oscillator, amplitude control means connected between the amplifier output and the oscillator input to maintain the amplitude constant, and means whose polarity will reverse upon deviation of frequency above or below a definite index connected to the amplifier output, and control means connected to the polarity reversing means.

5. In a control system, means whose inductance is altered by a change in its relative axial position in a magnetic field, capacity means connected thereto to form a resonant circuit, an oscillator controlled by said resonant circuit, a voltage amplifier connected to said oscillator, a power amplifier connected to the output of the voltage amplifier, a balanced frequency sensitive circuit connected to the output of the power amplifier in which frequency changes from an index frequency produce opposite polarities at its output for different directions of frequency swing from said index.

6. In a control system, means whose inductance is altered by a change in its relative axial position in a magnetic field, capacity means connected thereto to form a resonant circuit, an oscillator controlled by said resonant circuit, means whose output changes polarity when the input frequency varies above or below a defined index connected to the oscillator, relay means connected to the polarity changing output, switching means controlled by the relay and driving means controlled by the switching means and connected to the inductance means to correct its position in the magnetic field.

7. In a control system, means whose inductance is altered by a change in its relative axial position in a magnetic field, capacity means connected thereto to form a resonant circuit, an oscillator controlled by said resonant circuit, frequency sensitive means connected to the output of the oscillator including a transformer having a primary and a center tapped secondary, a connection between one end of the primary and the center of the secondary and a diode connected to each end of the secondary whereby the primary and one half of the secondary determine the resultant voltage across each diode and a variation in frequency on the transformer will cause a phase shift in each half to cause a polarity reversal at the output of the pair of diodes.

8. In a control system, means whose inductance is altered by a change in its relative axial position in a magnetic field, capacity means connected thereto to form a resonant circuit, an oscillator controlled by said resonant circuit, frequency sensitive means connected to the output of the oscillator including a transformer having a primary and a center tapped secondary, a connection between one end of the primary and the center of the secondary, a diode connected to each end of the secondary, a pair of resistors connected across the diode output whereby the resultant voltage developed across the resistors will reverse in polarity as the frequency on the primary changes due to phase shift on the primary and half secondary supplying power to the diodes.

9. In a control system, means whose inductance is altered by a change in its relative axial position in a magnetic field, capacity means connected thereto to form a resonant circuit, an oscillator controlled by said resonant circuit, frequency sensitive means connected to the output of the oscillator including a transformer having a primary and a center tapped secondary, a connection between one end of the primary and the center of the secondary, a diode connected to each end of the secondary, a pair of resistors connected across the diode output whereby the resultant voltage developed across the resistors will reverse in polarity as the frequency on the primary changes due to phase shift on the primary and half secondary supplying power to the diodes, a vacuum tube relay connected across the resistors, switching means operated by the relay, and control means operated by the switching means.

10. In a control system a magnetizable member subject to the earth's magnetic field, a coil mounted on said member so that the inductance thereof will be altered as the member changes its position and axial direction in the earth's field, a capacity connected to said coil and forming therewith a resonant circuit, an oscillator connected to and controlled by said circuit, means whose output changes polarity when the input frequency varies above or below a defined index connected to the oscillator and control means operated by said reversing means.

11. In a control system a magnetizable member subject to the earth's magnetic field, a coil mounted on said member so that the inductance thereof will be altered as the member changes its position and axial direction in the earth's field, a capacity connected to the coil and forming therewith a resonant circuit, an oscillator controlled by said resonant circuit, frequency sensitive means connected to the output of the oscillator including a transformer having a primary and a center tapped secondary, a connection between one end of the primary and the center of the secondary, a diode connected to each end of the secondary, a pair of resistors connected across the diode output whereby the resultant voltage developed across the resistors will reverse in polarity as the frequency on the primary changes due to phase shift on the primary and half secondary supplying power to the diodes.

FREDERICK W. CHAPMAN.